US012757950B2

(12) United States Patent
Hyde et al.

(10) Patent No.: US 12,757,950 B2
(45) Date of Patent: *Oct. 13, 2026

(54) AIRBAG ACTUATOR MOUNTED IN A CUSTOM BUCKLE FOR PERSONAL IMPACT PROTECTION SYSTEMS

(71) Applicant: Active Protective Technologies, Inc., Fort Washington, PA (US)

(72) Inventors: Aidan Hyde, Newton, MA (US); David Perry, Cambridge, MA (US); David Schoon, Stow, MA (US); Wamis Singhatat, Malvern, PA (US); Eric Sugalski, Newton, MA (US); Jon Wenderoth, Boston, MA (US)

(73) Assignee: Active Protective Technologies, Inc., Fort Washington, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/979,372

(22) Filed: Dec. 12, 2024

(65) Prior Publication Data

US 2025/0107581 A1 Apr. 3, 2025

Related U.S. Application Data

(63) Continuation of application No. 17/512,452, filed on Oct. 27, 2021, now Pat. No. 12,201,171, which is a
(Continued)

(51) Int. Cl.
*A41D 13/00* (2006.01)
*A41D 13/018* (2006.01)
(Continued)

(52) U.S. Cl.
CPC ....... *A41D 13/018* (2013.01); *A41D 13/0525* (2013.01); *A44B 11/25* (2013.01);
(Continued)

(58) Field of Classification Search
CPC .. A41D 13/018; A41D 13/0525; A41D 11/25; A41D 11/2546; A41D 11/2569; A41D 2200/10; B60R 21/0132
See application file for complete search history.

(56) References Cited

U.S. PATENT DOCUMENTS 2,084,636 A * 6/1937 Fromm .................. B63C 9/155
441/94
2,165,300 A * 7/1939 Peterson ................ B63C 9/155
441/94
(Continued)

FOREIGN PATENT DOCUMENTS

CN 2925426 Y 7/2007
CN 102481891 A 5/2012
(Continued)

OTHER PUBLICATIONS

Extended Search Report dated Sep. 20, 2019 received in corresponding European application No. 17760632.4, 4 pages.
(Continued)

*Primary Examiner* — Richale L Quinn
(74) *Attorney, Agent, or Firm* — Foley & Lardner LLP

(57) ABSTRACT

A protective device includes: a buckle including a first buckle half and a second buckle half, the first and second buckle halves being attachable to and detachable from one another; an adjustable support strap configured to extend around a waist or hips of an individual and having a first end attached to the first buckle half, and a second end attached to the second buckle half, the support strap having an inner surface configured to face the waist or hips of the individual, and an outer surface opposite the inner surface; an airbag assembly attached to and extending along the outer surface of the support strap and configured to extend at least
(Continued)

partially around the waist or hips of the individual; and an airbag actuator configured to actuate the airbag assembly.

13 Claims, 9 Drawing Sheets

Related U.S. Application Data continuation of application No. 16/079,701, filed as application No. PCT/US2017/019990 on Feb. 28, 2017, now Pat. No. 11,253,013.

(60) Provisional application No. 62/301,157, filed on Feb. 29, 2016.

(51) Int. Cl.
*A41D 13/05* (2006.01)
*A44B 11/25* (2006.01)
*B60R 21/0132* (2006.01)
*H01H 35/14* (2006.01)

(52) U.S. Cl.
CPC ...... *A44B 11/2546* (2013.01); *B60R 21/0132* (2013.01); *H01H 35/14* (2013.01); *A41D 2200/10* (2013.01); *A44B 11/2569* (2013.01)

(56) References Cited

U.S. PATENT DOCUMENTS

| | | | | | |
|---|---|---|---|---|---|
| 3,791,670 | A * | 2/1974 | Lucore | B60R 21/18 | 285/317 |
| 3,864,773 | A * | 2/1975 | Geary | B63C 9/155 | 441/94 |
| 3,874,694 | A * | 4/1975 | Stephenson | B60R 21/18 | 200/61.58 B |
| 4,626,221 | A * | 12/1986 | Rocco | B63C 9/155 | 441/108 |
| 5,022,879 | A | 6/1991 | Diforte | | |
| 5,133,084 | A * | 7/1992 | Martin | A42B 3/0486 | 2/468 |
| 5,180,321 | A * | 1/1993 | Brown | B63C 9/155 | 441/108 |
| 5,500,952 | A | 3/1996 | Keyes | | |
| 5,584,072 | A * | 12/1996 | Kim | A61F 13/06 | 2/22 |
| 5,931,489 | A * | 8/1999 | Damman | B60R 21/2171 | 280/728.2 |
| 6,062,449 | A | 5/2000 | Kahn | | |
| 6,109,647 | A * | 8/2000 | Akaba | B60R 21/01558 | 280/733 |
| 6,398,092 | B1 * | 6/2002 | Ansley | A61F 5/028 | 224/582 |
| 6,809,640 | B1 * | 10/2004 | Sherman | B60R 22/48 | 340/539.11 |
| 7,150,048 | B2 | 12/2006 | Buckman | | |
| 8,951,082 | B2 * | 2/2015 | Magnusson | B63C 9/19 | 441/108 |
| 9,107,615 | B2 * | 8/2015 | Buckman | G01C 19/04 | |
| 9,338,627 | B1 * | 5/2016 | Singh | G06F 3/0416 | |
| 9,643,725 | B2 * | 5/2017 | Dowhower | B64D 25/00 | |
| 10,709,180 | B2 * | 7/2020 | Yuan | A41D 1/002 | |
| 10,750,806 | B1 * | 8/2020 | Briggs | A41F 9/002 | |
| 11,089,146 | B2 * | 8/2021 | McLeod | H04B 1/385 | |
| 11,253,013 | B2 * | 2/2022 | Hyde | A44B 11/2546 | |
| 2001/0024032 | A1 | 9/2001 | Breed et al. | | |
| 2001/0034929 | A1 | 11/2001 | Suyama | | |
| 2002/0175499 | A1 * | 11/2002 | Mattes | A41D 13/018 | 280/728.1 |
| 2004/0183283 | A1 | 9/2004 | Buckman et al. | | |
| 2005/0177929 | A1 | 8/2005 | Greenwald et al. | | |
| 2005/0248136 | A1 * | 11/2005 | Breed | B60R 21/0152 | 280/742 |
| 2009/0008916 | A1 * | 1/2009 | Dziekan | B60R 21/013 | 280/735 |
| 2009/0066063 | A1 * | 3/2009 | Mical | B60R 21/18 | 280/733 |
| 2009/0184497 | A1 * | 7/2009 | Kjell | B60R 21/232 | 280/730.2 |
| 2012/0085378 | A1 * | 4/2012 | Chakraborty | A61H 3/00 | 135/65 |
| 2012/0210498 | A1 | 8/2012 | Mack | | |
| 2012/0256403 | A1 * | 10/2012 | Shields | B60R 22/48 | 280/733 |
| 2012/0292893 | A1 * | 11/2012 | Baca | B60R 21/18 | 29/428 |
| 2013/0026743 | A1 * | 1/2013 | Baca | F16L 27/093 | 137/15.01 |
| 2013/0187646 | A1 * | 7/2013 | Baca | B64D 11/062 | 324/262 |
| 2013/0221642 | A1 * | 8/2013 | Arnold | B60R 21/18 | 280/733 |
| 2013/0244516 | A1 * | 9/2013 | Magnusson | B63C 9/155 | 441/94 |
| 2013/0312168 | A1 * | 11/2013 | Raanan | A61B 5/6831 | 2/465 |
| 2014/0033413 | A1 * | 2/2014 | Briggs | A41D 1/002 | 2/466 |
| 2014/0090213 | A1 * | 4/2014 | Shikowitz | A44C 5/2085 | 24/587.12 |
| 2014/0239853 | A1 * | 8/2014 | Woodham | F21V 33/0064 | 362/253 |
| 2015/0021886 | A1 * | 1/2015 | Osterfeld | B60R 21/2176 | 280/728.3 |
| 2015/0099945 | A1 * | 4/2015 | Hawkins, III | A61B 5/1118 | 600/301 |
| 2015/0355218 | A1 * | 12/2015 | Jeong | G01C 19/5747 | 73/504.12 |
| 2015/0355219 | A1 * | 12/2015 | Kang | G01C 19/5783 | 73/514.16 |
| 2016/0280171 | A1 * | 9/2016 | Moeller | B60R 22/12 | |
| 2019/0069612 | A1 * | 3/2019 | Hyde | B60R 21/0132 | |
| 2020/0158862 | A1 * | 5/2020 | Mahmoud | G01S 13/931 | |
| 2020/0285873 | A1 * | 9/2020 | Condon | G06V 40/10 | |
| 2021/0235787 | A1 * | 8/2021 | Jeandupeux | A61B 5/1117 | |
| 2021/0386145 | A1 * | 12/2021 | Dong | A41D 19/0024 | |
| 2021/0398665 | A1 * | 12/2021 | Kaji | G16H 20/30 | |

FOREIGN PATENT DOCUMENTS

| | | | |
|---|---|---|---|
| CN | 202873907 | U | 4/2013 |
| CN | 103342159 | A | 10/2013 |
| CN | 203581356 | U | 5/2014 |
| CN | 104270979 | A | 1/2015 |
| CN | 104783387 | A | 7/2015 |
| CN | 204750528 | U | 11/2015 |
| CN | 105148425 | A * | 12/2015 |
| CN | 204908025 | U | 12/2015 |
| DE | 20 2010 013 553 | U1 | 12/2010 |
| JP | 2001-315617 | A | 11/2001 |
| JP | 2002-331041 | A | 11/2002 |
| JP | 2006-282164 | A | 10/2006 |
| JP | 2014-514462 | A | 6/2014 |
| KR | 101465587 | B1 | 11/2014 |

OTHER PUBLICATIONS

Final Office Action in U.S. Appl. No. 17/512,452 DTD Jul. 23, 2024.

Final Office Action in U.S. Appl. No. 17/512,452 DTD Oct. 13, 2023.

International Preliminary Report on Patentability received in corresponding International Application No. PCT/US2017/019990 mailed Sep. 13, 2018, 10 pages.

International Search Report in International Application No. PCT/US2017/019990 mailed May 24, 2017, 3 pages.

Non-Final Office Action in U.S. Appl. No. 17/512,452 DTD Jan. 31, 2024.

(56) References Cited

OTHER PUBLICATIONS

Non-Final Office Action in U.S. Appl. No. 17/512,452 DTD May 22, 2023.
Notice of Allowance in U.S. Appl. No. 17/512,452 DTD Sep. 16, 2024.
Office Action dated Dec. 18, 2019 received in corresponding Chinese application No. 201780023696.1 (7 pages)and English translation (4 pages).
Office Action dated Jan. 5, 2021 received in corresponding Japanese Application No. 2018-545195, (11 pages) and English translation (9 pages).
Office Action DTD Jan. 22, 2021 received in corresponding Chinese application No. 201780023696.1, (9 pages) and English machine translation (9 pages).
Office Action mailed Jul. 29, 2020 in corresponding Chinese Application No. 201780023696.1 (8 pages) and English machine translation (9 pages).
Second Office Action dated Jul. 5, 2023 issued in CN Application No. 202111002146.6, with English translation, 57 pages.
U.S. Office Action in U.S. Appl. No. 16/079,701 DTD Nov. 20, 2020.
U.S. Office Action in U.S. Appl. No. 16/079,701 DTD Aug. 17, 2021.
Written Opinion of the International Searching Authority received in International Application No. PCT/US2017/019990 mailed May 24, 2017, 9 pages.

* cited by examiner

AIRBAG ACTUATOR MOUNTED IN A CUSTOM BUCKLE FOR PERSONAL IMPACT PROTECTION SYSTEMS

CROSS REFERENCE TO RELATED APPLICATIONS

The present application is a Continuation Application of U.S. application Ser. No. 17/512,452, filed Oct. 27, 2021, which is a Continuation Application of U.S. application Ser. No. 16/079,701, filed Aug. 24, 2018, now U.S. Pat. No. 11,253,013, which is a U.S. National Stage of International Application No. PCT/US2017/019990, filed on Feb. 28, 2017, which claims the benefit of U.S. Provisional Patent Application No. 62/301,157, filed on Feb. 29, 2016, the entire disclosures of all of which are incorporated herein by reference.

TECHNICAL FIELD

The present disclosure relates to large component housings in personal impact protection systems, and also relates to a method for using the same.

BACKGROUND

The use of inflatable airbags/cushions to protect individuals from impact is known in the art. Applications of this technology to the protection of ambulating individuals, in particular, the elderly whom are more prone to falls, is a more recent development. For example, U.S. Pat. No. 7,017,195, issued on Mar. 28, 2006, U.S. Pat. No. 7,150,048, issued on Dec. 19, 2006, and U.S. Pat. No. 9,107,615, issued on Aug. 18, 2015, all assigned to the same assignee as the present application, and all incorporated herein by reference in their entireties, describe active protective garments and motion analysis systems for protecting individuals from falls.

One consideration for the creation of a practical system for the protection of individuals from fall impacts is the secure fastening of large components related to the activation process to a person's body. These large components may include rigid air canisters, batteries, or other objects associated with the protection activation process.

SUMMARY

In order to create a practical wearable system associated with the deployment of personal protective airbags/cushions, large rigid objects should be placed in a way that observes certain restrictions which do not apply to inflatable cushion systems utilized in automotive or industrial applications such as restrictions on size and weight, and conformation to human anatomy. Of note is the need to push all large rigid objects as far anterior to the user as is practical to avoid discomfort for an individual wearing the system during activities of daily living, such as while sitting or sleeping. As these systems are often targeted at elderly individuals with mobility impairment, the system should also make provisions for easy operation by individuals with impaired dexterity that make up a significant portion of this group.

The present disclosure reveals practical means for locating the large rigid components associated with inflating a protective cushion/airbag in the anterior position of a garment containing said active protection system that is worn by the elderly or individuals with impaired mobility. This goal is achieved by creating a custom buckle for the garment that holds the large rigid structures and enables securing/removal of the garment with no or minimal fine motor activities such as pressing a button or moving a latch.

BRIEF DESCRIPTION OF THE DRAWINGS

The foregoing summary, as well as the following detailed description of illustrative embodiments of the airbag actuator mounted in a custom buckle of the present application, will be better understood when read in conjunction with the appended drawings. For the purposes of illustrating the airbag actuator mounted in a custom buckle of the present application, there is shown in the drawings illustrative embodiments. It should be understood, however, that the application is not limited to the precise arrangements and configurations shown. In the drawings.

DETAILED DESCRIPTION

Figure 1A:
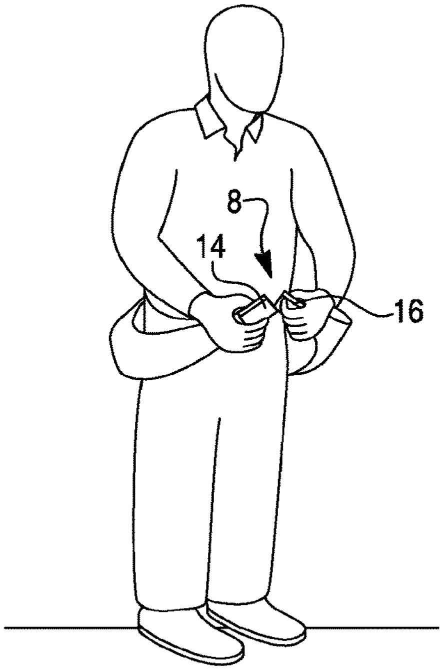
FIGS. 1A and 1B are illustrations depicting a user interacting with a protective garment with an airbag actuator mounted in a custom buckle.
Figure 1B:
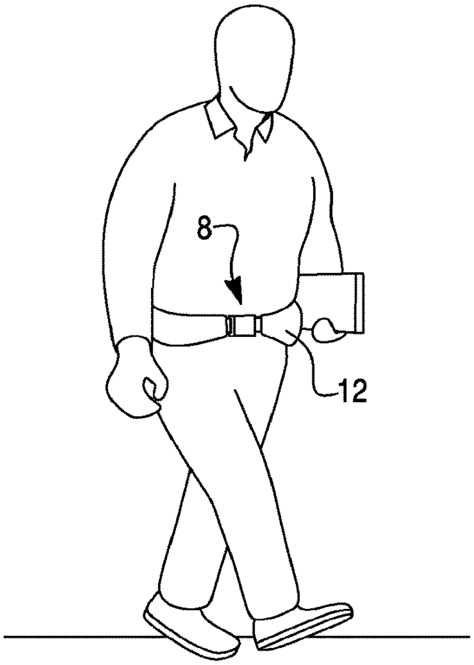

FIGS. 1A and 1B are illustrations depicting a user interacting with a protective garment with an airbag actuator mounted in a custom buckle is shown in which a first, non-removable outer cover or garment 12 covers the system and the user affixes the system around their hips using a buckle 8 that includes a first buckle half 14 and a second, mating buckle half 16. The buckle 8, in this instance, then sits at the anterior most location on the user's waist.

Figure 2:
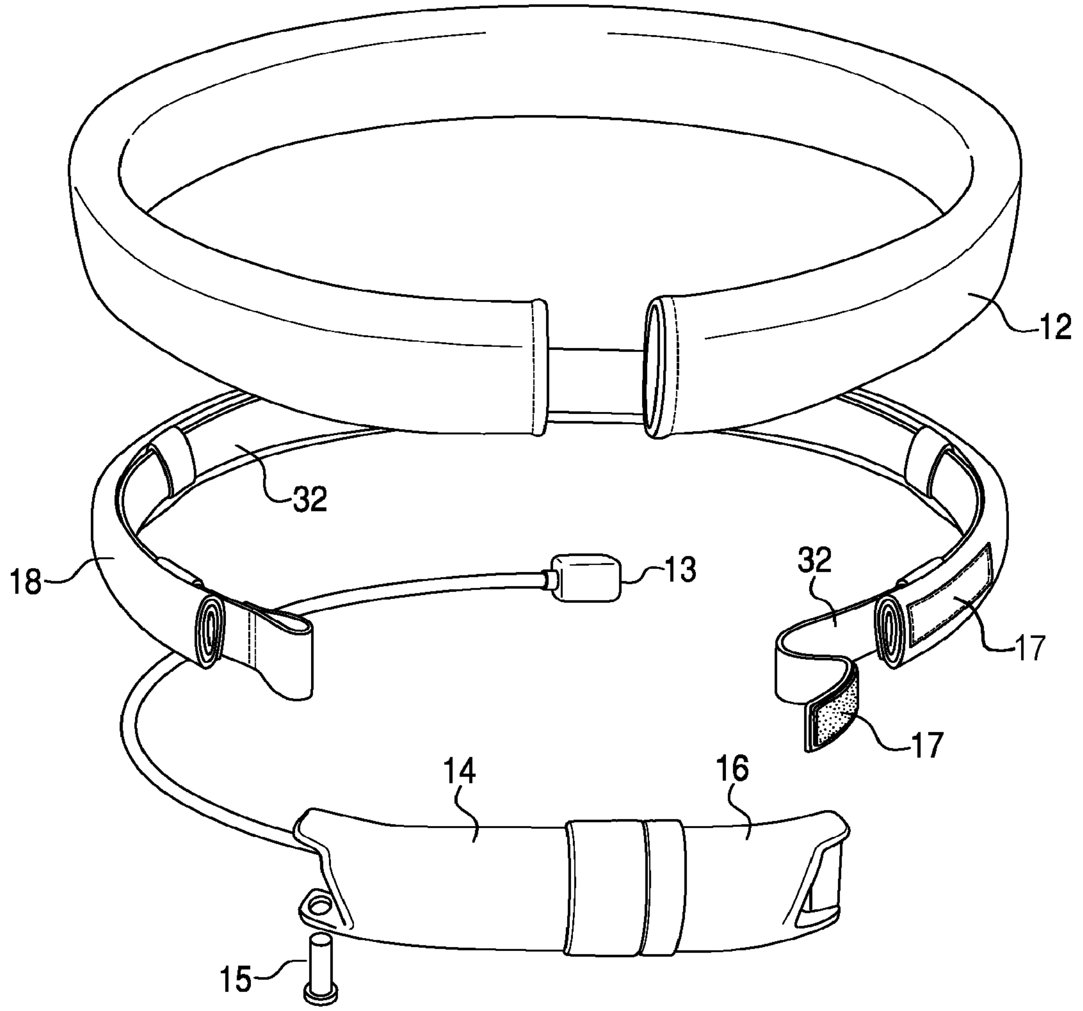
FIG. 2 is a perspective view of an exploded assembly of a protective garment with an airbag actuator mounted in a custom buckle.

Referring to FIG. 2, a perspective view of an exploded assembly of a protective garment with an airbag actuator 10 mounted in a custom buckle 8 is shown. The protective garment includes a first outer cover 12—which covers an airbag assembly 18 that attaches to the buckle 8. The first outer cover 12 is preferably non-removable, and formed in a tubular shape. The first outer cover 12 may be form-fitting over airbag assembly 18 and custom buckle 8. Buckle 8 includes the buckle half 14 and the mating buckle half 16. Airbag assembly 18 is rolled downward and inward inside of the first outer cover 12. A hinge pin 15 secures the airbag assembly 18 to the buckle half 14. Buckle half 16 is secured to airbag assembly 18 via strap 32, which may be include a hook-and-loop fastener 17 to attach the buckle half 16 to the airbag assembly 18. For example, one half of the hook and loop fastener 1 7 may be on the strap 32, while the other half of the hook and loop fastener 17 maybe on the airbag assembly 18, as shown in FIG. 2. Thus, the length of the strap 32 is adjustable using the hook and loop fasteners 17. The protective garment includes a first inertial sensor 13 for measurement of 3-dimensional motions (e.g., a 9-axis inertial measurement sensor) of the user. A control unit, discussed in more detail below, may be provided at a location of the inertial sensor 13, or at a location other than that of the inertial sensor 13.

Strap 32 may be made of commonly used webbing materials such as polyester, nylon, or a blend. The buckle 8 is attached to the airbag assembly 18 via the strap 32. A first end of the support strap 32 is attached to the buckle half 14, and a second, opposing end of the support strap 32 is attached to the buckle half 16. In this embodiment, buckle half 14 mates to buckle half 16 in a position substantially offset from the mid-plane of the anterior aspect of the user's waist, such that actuator 10 is fully contained within buckle half 14 and does not protrude into buckle half 16 when buckle 8 is buckled. In other embodiments, the buckle halves 14 and 16 may be directly attached to the airbag assembly 18.

In this embodiment, the buckle halves 14, 16 are hollow, so that rigid components, such as the actuator 10 and/or a battery 22, can be located inside the buckle halves 14, 16. The buckle 8 may be made of any number of plastic materials, including but not limited to ABS, polycarbonate, nylon, PEEK, or a lightweight composite material such as carbon-fiber. The buckle 8 may alternatively be made out of a lightweight metal alloy such as titanium, or any combination of the aforementioned materials.

In one embodiment, the first inertial sensor 13 is disposed on a back side of the protective garment. In another embodiment, the first inertial sensor 13 is disposed on a location on the protective garment different from the back side of the protective garment. For example, the first inertial sensor 13 may be located on the buckle of the protective garment.

In one embodiment, a second inertial sensor (not shown) is built into the protective garment. The second inertial sensor may measure only g-force, and thus may include only a tri-axial accelerometer. The second inertial sensor is configured to detect a baseline level of activity. If the second inertial sensor detects a sufficient level of activity and motion in a user, the second inertial sensor activates a wake cycle for the protective garment. If the second inertial sensor fails to detect a sufficient level of activity and motion in a user, the second inertial sensor activates a sleep cycle for the protective garment.

Figure 3A:
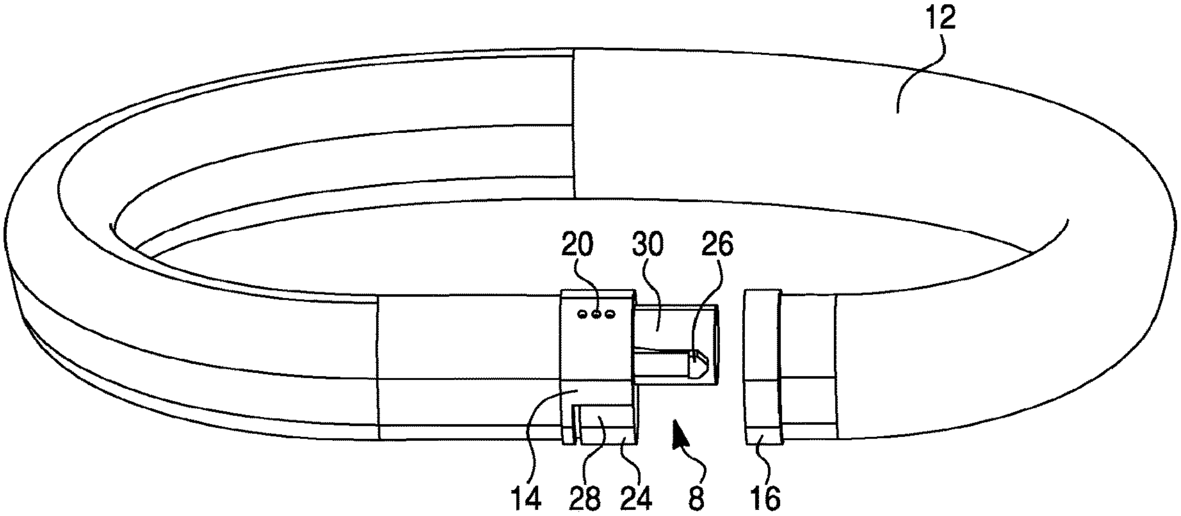
FIG. 3A is a perspective view of the outside surfaces of a protective garment with an airbag actuator mounted in a custom buckle in its unbuckled state.

Referring to FIG. 3A, a perspective view of the outside surfaces of a protective garment with an airbag actuator mounted in a custom buckle 8 in its un-buckled state is shown. Either the buckle half 14 or the mating buckle half 16 may include a connector that creates a secure connection between the two buckle halves when a user pushes or twists the halves together. This allows the user to attach or remove the garment without using features that require fine motor skills such as buttons or latches. For example, as shown in FIG. 3A, the buckle half 14 or the mating buckle half 16 may include a spring clip 26. In this embodiment, the spring clip 26 is located on a projecting portion 30 that extends from a base portion 28 of the buckle half 14, described in more detail below. Additionally, the buckle 8 may incorporate magnets to aid the user in aligning buckle half 14 with mating buckle half 16. Alternatively, buckle 8 may utilize other types of secure connectors, including but not limited to a traditional button, snap button, traditional buckle latch, hook-and-loop latch, screw threads, or zipper.

Figure 3B:
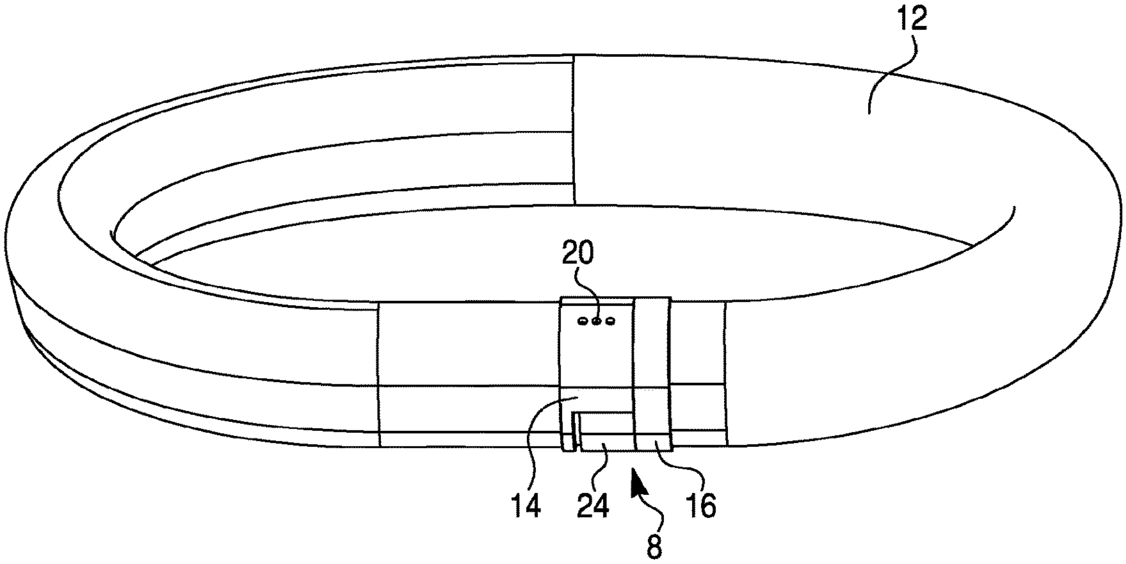
FIG. 3B is a perspective view of the outside surfaces of a protective garment with an airbag actuator mounted in a custom buckle in its buckled state.

Referring to FIG. 3B, a perspective view of the outside surfaces of a protective garment with an airbag actuator mounted in a custom buckle in its buckled state is shown. It can be seen in this figure that either the buckle half 14 or the mating buckle half 16 may include space for visual indicators 20 such as an LED or array of LEDs or other indicators. It can also be seen that either the buckle half 14 or the mating buckle half 16 may include an access door 24 to components inside of the system such as a battery 22 which is shown in FIG. 4.

In one embodiment, a light sensor is connected to a floor path LED configured to shine an LED light onto a floor immediately in front of a user wearing the belt such that a user can see the immediately surrounding floor space. The light sensor detects a level of light in an environment surrounding a user (e.g., a room the user is in). If low levels of light are detected by the light sensor when the belt is being worn by a user and the first inertial sensor 13 detects that the user is upright, the floor path LED is activated and turned on.

Figure 4:
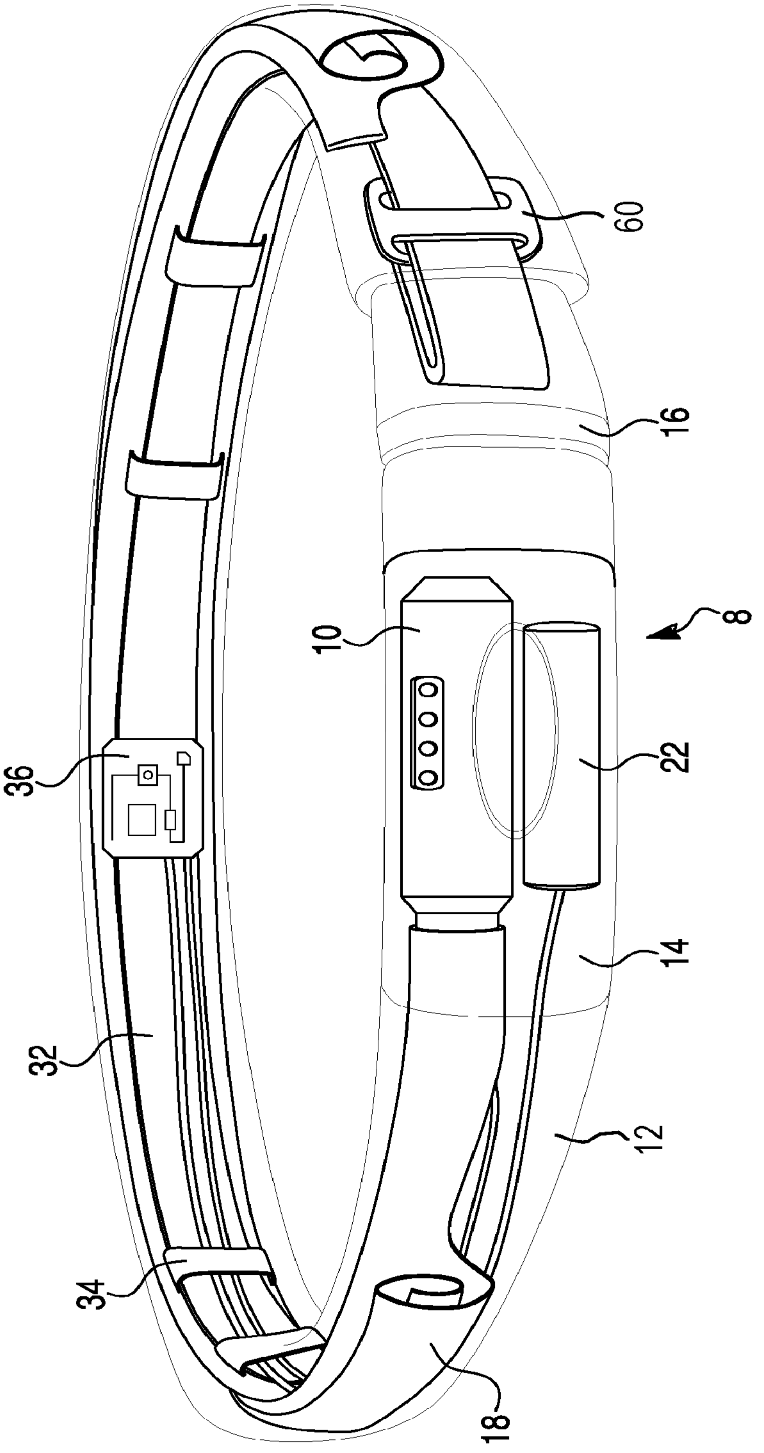
FIG. 4 is a perspective view of the internal components of a protective garment with an airbag actuator mounted in a custom buckle, according to one alternative embodiment.

Referring to FIG. 4, a perspective view of the internal components of a protective garment with an airbag actuator 10 mounted in a buckle 8 according to one alternative embodiment is shown. In this figure, it can be seen that the airbag assembly 18 which runs around the inside of the first outer cover 12 connects to an airbag actuator 10 inside of the buckle half containing the actuator 14. The connection between airbag assembly 18 and the airbag actuator is form-fitting to provide an air-tight seal such that when the airbag actuator deploys, air is provided to expand the airbag assembly 18 without leaking air. The air that inflates the airbag assembly 18 may move from the actuator 14 around the garment by way of this connection. The first outer cover 12 may be made of typical clothing materials such as polyester, cotton, nylon, or a blend, and further includes a longitudinal "burst" seam designed to separate upon inflation of the airbag assembly 18. The burst seam may be a tearable seam, or a seam connected by a hook and loop fastener, snaps, or a burst zipper. The first outer cover 12 may be tubular. The airbag assembly may be rolled upwards and inwards within the first outer cover 12. The airbag assembly 18 is attached to a support strap 32. The support strap 32 is preferably an adjustable strap that can be adjusted to closely match a circumference of the user's waist. The first outer cover 12 may include a zipper or other type of closable portal to allow access to the support strap 32 for adjustment. In the example, of FIG. 4, the airbag assembly 18 includes a plurality of loops 34, and is attached to the support strap 32 via the loops 34. Support strap 32 may be made of commonly used webbing materials such as polyester, nylon, or a blend. The buckle 8 is attached to the airbag assembly 18 via the strap 32. A first end of the support strap 32 is attached to the buckle half 14, and a second, opposing end of the support strap 32 is attached to the buckle half 16. In this embodiment, the strap 36 is adjustable using a double-loop slider type buckle 60, rather than a hook and loop fastener as in the embodiment of FIG. 2. In this embodiment, buckle half 14 mates to buckle half 16 in a position substantially offset from the mid-plane of the anterior aspect of the user's waist, such that actuator 10 is fully contained within buckle half 14 and does not protrude into buckle half 16 when buckle 8 is buckled. In other embodiments, the buckle halves 14 and 16 may be directly attached to the airbag assembly 18.

Still referring to FIG. 4, it can be seen that large rigid objects such as the airbag actuator 10 and the battery 22 sit inside the buckle half 14 and can span across both sides of the mid plane of a body when the buckle 8 is located at an anterior-most point on a user, which allows the rigid objects to sit at the anterior-most point on a user.

Figure 5A:
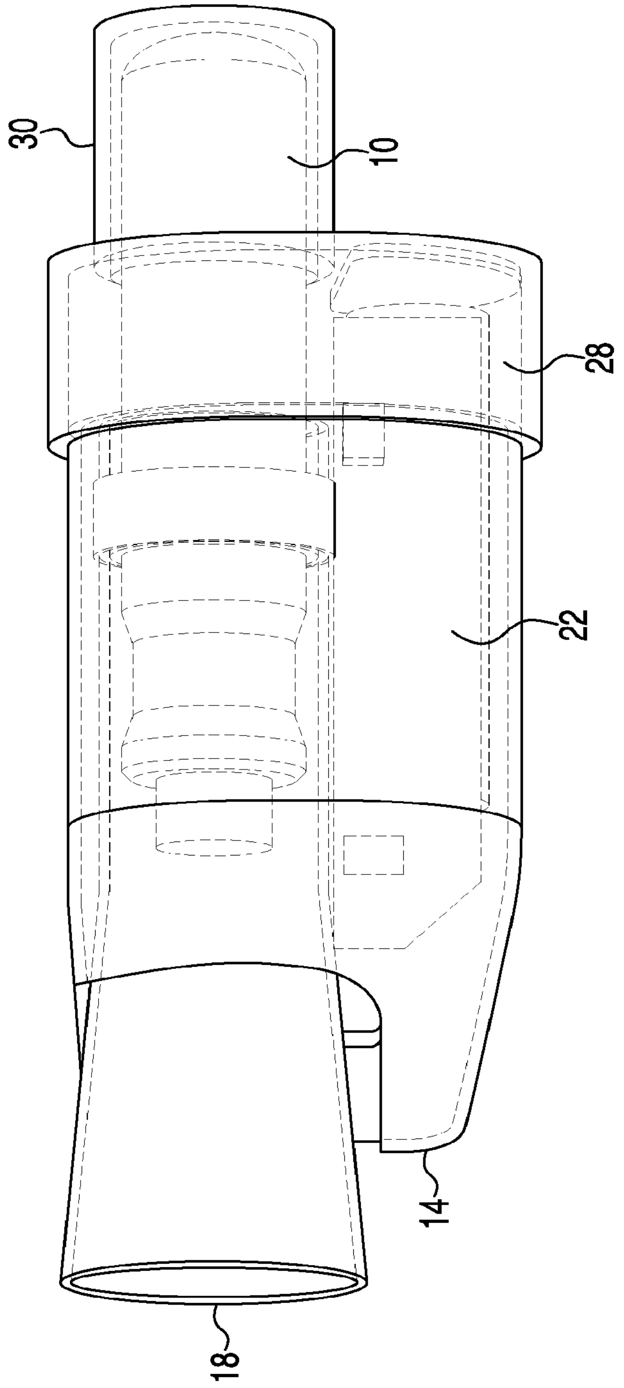
FIG. 5A is a perspective view of the internal components of an airbag actuator mounted in a custom buckle in its unbuckled state.
Figure 5B:
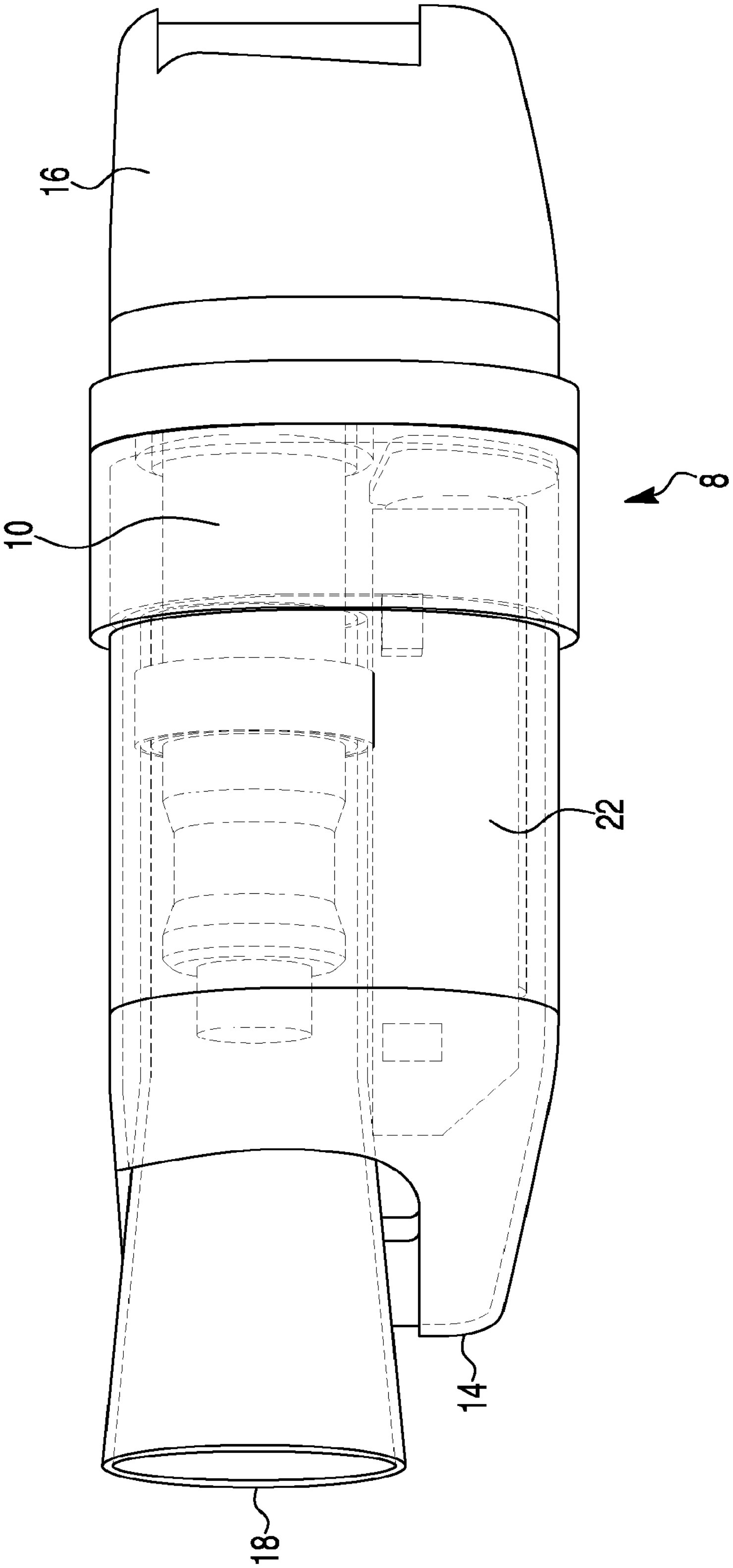
FIG. 5B is a perspective view of the internal components of an airbag actuator mounted in a custom buckle in its buckled state.

FIG. 5A is a perspective view of the internal components of an airbag actuator 10 mounted in the buckle 8 in its unbuckled state. FIG. 5B is a perspective view of the internal components of an airbag actuator mounted in a custom buckle in its buckled state. In FIG. SA, it can also be seen that the airbag actuator 10 is partially located in the base portion 28 of the buckle half 14, and partially located in the projecting portion 30 that extends from the base portion 28. When the buckle 8 is buckled, the extending portion 30 of the buckle half 14 extends into the mating buckle half 16, as shown in FIG. 5B. Thus, when the buckle 8 is buckled, the actuator 10 is located in both the buckle half 14 and the buckle half 16. This allows the weight and volume of the actuator 10 to be evenly distributed across the anterior of the waist of an individual during use, while allowing buckle half 14 to mate to buckle half 16 in a position on or near the mid-plane of the anterior aspect of the user's waist. In other embodiments, both the actuator 10 and the battery 22 can be partially located in the protecting portion 30, so that, when the buckle 8 is buckled, both the actuator 10 and the battery 22 are located in both the buckle half 14 and the buckle half 16. This allows the weight and volume of both the actuator 10 and the battery 22 to be evenly distributed across the anterior of the waist of an individual during use, while allowing buckle half 14 to mate to buckle half 16 in a position on or near the mid-plane of the anterior aspect of the user's waist.

It should be appreciated that while an airbag actuator mounted in a custom buckle has been described in accordance with one embodiment, the airbag actuator mounted in a custom buckle can be constructed in accordance with any suitable alternative embodiment as desired. For instance, more than one actuator associated with a buckle, more than one flow direction used for inflation, more than one type of actuator, as well as actuator mounting locations outside of or completely independent of a rigid housing.

Referring to FIG. 4, it can be seen that the airbag actuator 10 contained in the buckle half 14 may be substituted with a smaller actuator that does not span the mid-plane of the user's body and may not occupy space in both buckle halves. Any airbag actuator 10 or other rigid component such as a battely 22, in addition to being distributed between the buckle half 14 and the mating buckle half 16 may also be secured to the anterior most location of the user in a position on top of, below, behind, in front of, to either side, or completely separate from any rigid buckle or buckle housing.

As an alternative to the embodiment shown in FIG. 4, airflow from the airbag actuator 10 can be diverted at the buckle and flow in two directions around the body either simultaneously or independently to fill cushions in the airbag assembly 18. Referring to FIG. 4, the protective device includes a control unit 36 that includes one or more sensors, such as accelerometers, gyroscopes, etc, and a controller configured to control actuation of the airbag actuator 10 based on signals received from the one or more sensors. The control unit 36 may be attached to the outer cover 12, such that the control unit 36 is slidable relative to the strap 32. This way, the control unit 36 can be centered on the device when the strap is adjusted. While the control unit is located on an inner side of the strap 32 in FIG. 4, the control unit may alternatively and preferably be located on an outer side of the strap 32, and attached to an inner surface of the outer cover 12. A valve system or other means of controlling air flow may be used to selectively inflate cushions located on multiple parts of the system Other means of achieving selective cushion inflation could include using two or more airbag actuators 10. Said actuators may all be located in the buckle half 14, may be distributed along the first outer cover 12, or may be distributed between the buckle half 14 and the mating buckle half 16. This multitude of airbag actuators may also be used simultaneously to achieve the same function of the single airbag actuator 10 described in the original embodiment. Selective air flow may be used for many purposes including exclusive cushion deployment over predicted zones of impact. In some embodiments, at least a portion of the control unit 36 is located in the buckle half 14 or buckle half 16.

Figure 6:
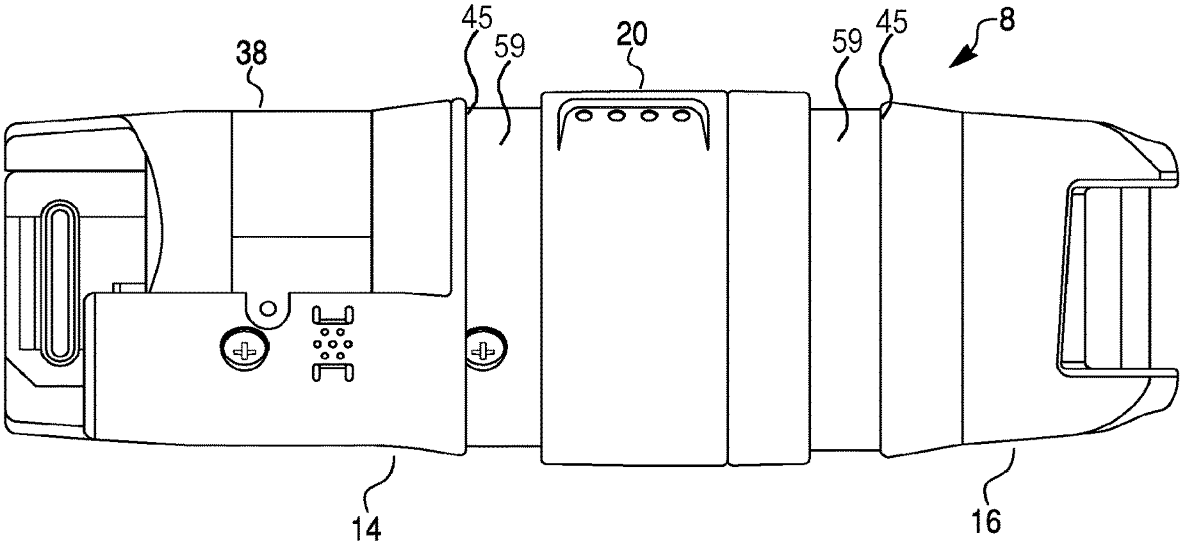
FIG. 6 is a front view of the outside of a custom buckle in its buckled state

Referring to FIG. 6, an additional embodiment of a buckle 8 is shown. Buckle 8 includes buckle half 14 and mating buckle half 16. Buckle half 14 includes a flexible hatch 38 which may be formed, for example, of an elastomeric material (e.g., thermoplastic polyurethane). The flexible hatch 38 allows the buckle half 14 to expand when the airbag is inflated. This way, if back pressure from the airbag enters the buckle half 14, the buckle half 14 can expand due to the flexible hatch, rather than cracking.

Figure 7:
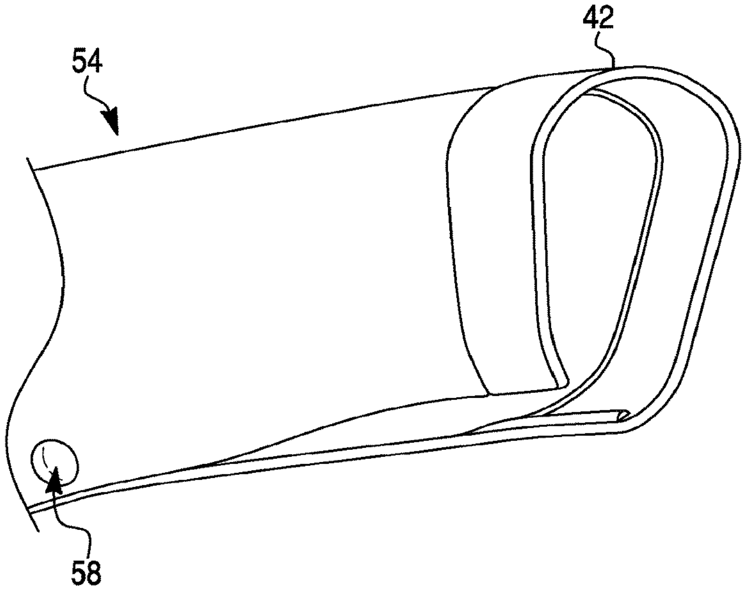
FIG. 7 is a perspective view of a removable outer cover for a protective garment.
Figure 8:
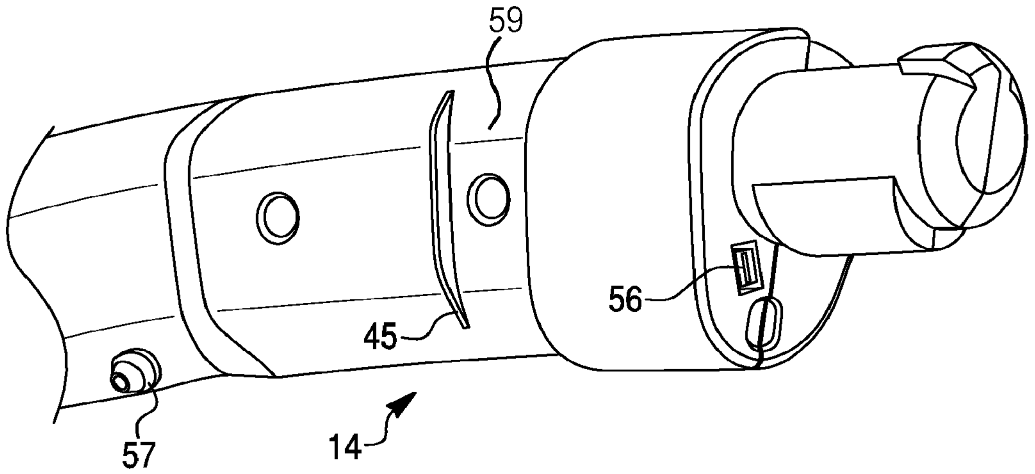
FIG. 8 is a perspective view of a buckle half of a protective garment in an unbuckled state with an outer cover removed.

FIG. 7 shows a perspective view of a second, removable outer cover 54 for the protective garment, which can cover the first outer cover 12 discussed above. The second outer cover 54 is U-shaped so that it is removable from the remainder of the protective garment. Second outer cover 54 is configured to fit over the first outer cover (shown in FIG. 2). Second outer cover 54 includes U-shaped clips 42 and a fabric portion (not shown) disposed between a first end and a second end of second outer cover 54. The U-shaped clips 42 are integrated into the fabric of the second, removable outer cover 54 at each end of the second outer cover 54. The U-shaped clips are flexible, semi-rigid, or rigid, and are made of a material such as plastic (e.g. ABS), metal alloy (e.g. spring steel), or a combination thereof. Each buckle half 14, 16 includes a step 45 which defines an edge of a groove 59 (see FIGS. 6 and 8) configured to engage with each U-shaped clip 42, along an inner surface of each U-shaped clip 42. Each buckle half 14, 16 includes first snaps 57 configured to mate with corresponding second snaps 58 of outer cover 54. In some aspects, first snaps 57 are colored snaps configured to be easily locatable by a user. Alternatively, hook and loop fasteners may be used rather than snaps 57, 58. The removable outer cover 54 may be waterproof.

In one embodiment, the buckle 8 has a locking element for preventing a user with cognitive impairment from removing the protective garment. The locking element may disposed at a suitable location on either of the buckle halves 14, 16 to prevent a user from unlocking and removing the device. For example, the locking element may be located on the bottom of one or both of the buckle halves, so that the wearer cannot easily see or manipulate the locking element while wearing the protective garment.

In one embodiment, the protective garment has at least one storage compartment. In some examples, the storage compartment is integrated with the protective garment or the first outer cover 12 or the second outer cover 54 (e.g., a plurality of pockets). In some further examples, the storage compartment is an external pack or pouch (e.g., a Fanny pack) connected to the buckle. Specifically, the external pack or pouch hangs on the buckle using a suitable fastener (e.g., a hook-and-loop fastener).

Figure 9:
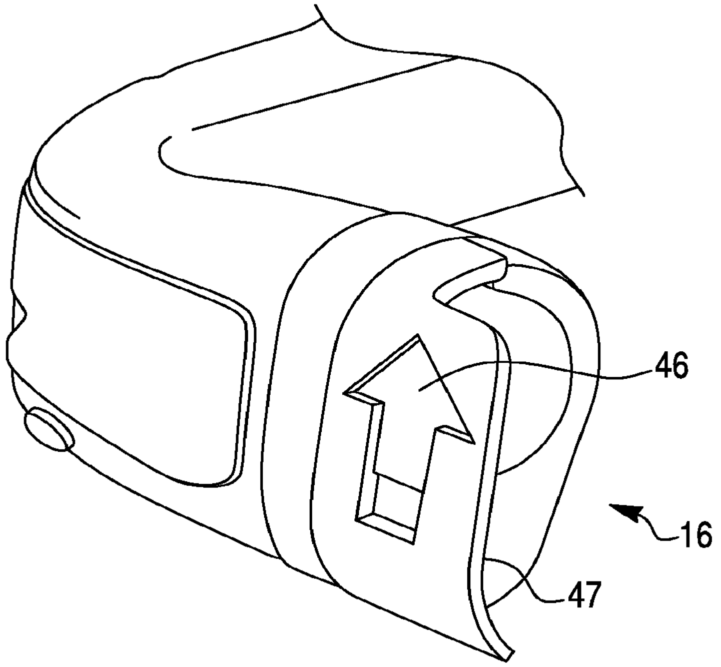
FIG. 9 is a perspective view-of a mating buckle half having an extended backwall, in an unbuckled state.

In the embodiment shown in FIG. 9, the mating buckle half 16 includes an extended back wall 47 that extends behind the buckle half 14 when the two buckle halves 14, 16 are connected. The back wall 47 inhibits the pinching of clothing or skin when the two buckle halves 14, 16 are buckled. In other embodiments, the back wall 47 may be located on the buckle half 14 and extend behind the buckle half 16. One or both buckle halves 14, 16 may include an orientation indicator configured to visually indicate to a user whether the protective garment is being worn with a correct orientation. In the embodiment shown in FIG.

9, the orientation indicator 46 is an orientation arrow located on the extended back wall 47 of the mating buckle half 16. The back wall 47 has a cutout 51 configured to allow the proximity sensor 50 (shown in FIG. 10) to sense a proximity to a user's body. For example, in the embodiment of FIG. 9, the cutout 51 is located at a bottom portion of the orientation arrow 46.

Figure 10:
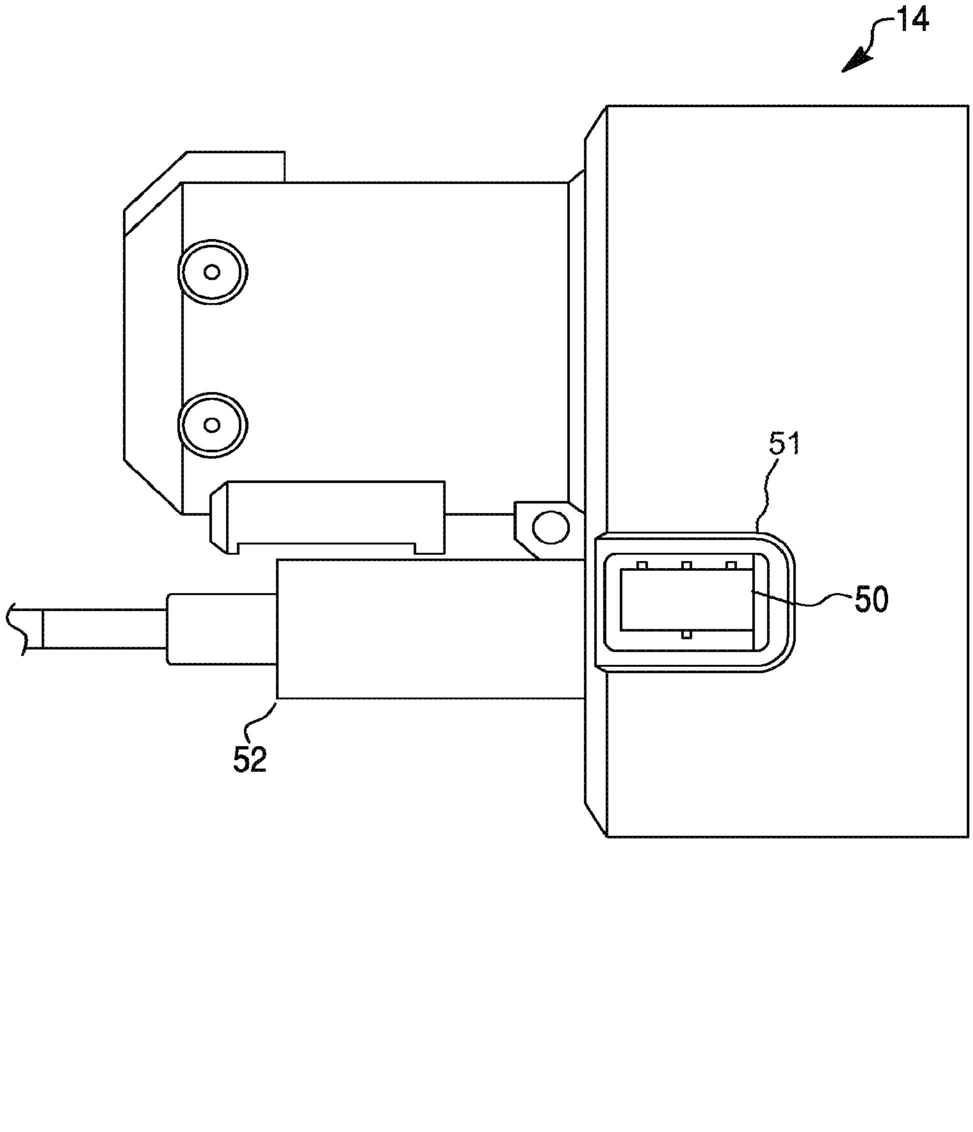
FIG. 10 is a back view of an inside surface of a buckle half in an unbuckled state.

Referring to FIG. 10, a perspective view of a back of buckle half 14 in an unbuckled state is shown, according to another embodiment. Buckle half 14 includes a proximity sensor 50 disposed on an inside surface of the buckle half 14 (e.g., the proximity sensor is disposed on a surface of the buckle half adapted to be adjacent to the body or garments worn on the body of a user). The proximity sensor 50 is configured to detect whether or not a user has put the protective garment on correctly (e.g., whether the protective garment is inside in). When a user puts the protective garment on inside out, the proximity sensor 50 does not detect the body or clothing of the user being near the proximity sensor 50, so an electrical signal is sent from the proximity sensor 50 to the airbag assembly, disabling the airbag and activating an alert. FIG. 10 also shows a cable 52 (such as a USB cable) configured to connect with a port 56 (shown in FIG. 8). The port 56 and cable 52 can be used to charge the battery 22 of the protective garment, upload and download data and updates, etc.

In some aspects the protective garment has one or more alert modalities for alerting the user of predetermined situations. For example, as discussed above, an alert may be provided when the belt is on inside-out, as indicated by the proximity sensor 50. An alert may also be provided for other situations detected by control unit 36, such as if a battery of the protective garment is low, if there is an unrecoverable electronic system error, if a fall is detected, and if the belt is worn upside-down.

The alert modalities may include, for example, a visual alert, such as from one or more lights, an audible alert, such as a sound or voice alert from a speaker, and/or a haptic alert such as a vibration from an actuator such as an ERM (eccentric rotating mass) motor.

Additionally, in some embodiments, the protective garment can include a wireless device configured to send an alert to a caregiver. For example, the wireless device can send a signal over a WiFi, Bluetooth, cellular network, or any combination thereof, when control unit 36 determines that a fall has occurred. The wireless device may be connected via WiFi internet connection to a cloud based application that can relay alerts via SMS text and/or email associated with the caregiver. The wireless device may also be connected to a user's cellphone which can relay alerts and the user's location using a cellular connection and the cellphone's Global Positioning System (GPS) coordinates. Alternatively, the protective garment can include cellphone communication and GPS location capabilities.

The buckle should be kept centered on the body of a user when it is being worn to ensure optimal performance of the protective garment and to minimize risk of harm to the user. To ensure that the buckle remains centered, semi-rigid curved hip cups may be attached to or incorporated within the protective garment. The hip cups may be configured to be of a curvature corresponding to a curvature of a user's hips, so that the hip cups rest on the user's hips. The hip cups may be permanent or removable. In some aspects, the hip cups are of a universal design and size and are somewhat moldable such that the hip cups are configured to conform to a user's hips. In some aspects, the plurality of hip cups are of a predetermined size corresponding to a size of a specific user's hips.

In another embodiment, the protective garment may have a curved waistband such that when the protective device is buckled and laid in a horizontal position, the buckle and a posterior region of the protective device are located below hip portions of the protective device It will be appreciated by those skilled in the art that various types of airbag actuators may be used as the airbag actuator 10. Examples include cold gas inflators, hybrid inflators, pyrotechnic inflators and others. Inflators using compressed gas may use a number of different gasses including carbon dioxide, nitrogen, nitrous oxide, helium, argon, mixtures of these gasses, air, and other gasses.

It will be appreciated by those skilled in the art that changes could be made to the embodiments described above without departing from the broad inventive concept thereof. Furthermore, it should be appreciated that the structure, features, and methods as described above with respect to any of the embodiments described herein can be incorporated into any of the other embodiments described herein unless otherwise indicated. It is understood, therefore, that this invention is not limited to the particular embodiments disclosed, but it is intended to cover modifications within the spirit and scope of the present disclosure.

The invention claimed is:

1. A protective device comprising:

a buckle comprising a first buckle half and a second buckle half, the first and second buckle halves being attachable to and detachable from one another;

an adjustable support strap configured to extend around a waist or hips of an individual and having a first end attached to the first buckle half, and a second end attached to the second buckle half, the support strap having an inner surface configured to face the waist or hips of the individual, and an outer surface opposite the inner surface;

an airbag assembly attached to and extending along the outer surface of the support strap and configured to extend at least partially around the waist or hips of the individual, wherein the airbag assembly includes a rolled portion that extends continuously along a majority of the support strap, and an entirety of the rolled portion of the airbag assembly is located outward of the support strap; and an airbag actuator configured to actuate the airbag assembly.

2. The protective device according to claim 1, wherein:

the first buckle half comprises a base portion, a first portion of the airbag actuator is located in the base portion, and a second portion of the airbag actuator extends from the base portion, such that, when the first buckle half is attached to the second buckle half, the second portion of the airbag actuator is located in the second buckle half.

3. The protective device of claim 2, wherein:

the first buckle half comprises a projecting portion extending from the base portion, and the second portion of the airbag actuator is located in the projecting portion such that, when the first buckle half is attached to the second buckle half, both the projecting portion and the second portion of the airbag actuator are located in the second buckle half.

4. The protective device of claim 1, further comprising:

a control unit comprising a controller configured to control actuation of the airbag actuator; and a battery configured to power the controller, wherein at least a portion of the battery is disposed in the first buckle half or the second buckle half.

5. The protective device of claim 4, wherein at least a portion of the control unit is disposed in the first buckle half or the second buckle half.

6. The protective device of claim 1, wherein:

the airbag assembly includes a plurality of loops, and the airbag assembly is attached to the support strap via the loops.

7. The protective device of claim 1, further comprising a first outer cover that covers the airbag assembly, wherein the first outer cover includes a seam configured to separate upon actuation of the airbag assembly.

8. The protective device of claim 1, wherein the first buckle half comprises a flexible hatch configured to expand when the air bag assembly is inflated.

9. The protective device of claim 8, wherein the flexible hatch is formed of an elastomeric material.

10. The protective device of claim 1, further comprising a first inertial sensor configured to measure 3-dimensional motions and disposed on a predetermined location on the protective device.

11. The protective device of claim 10, wherein the first inertial sensor comprises a 9-axis inertial measurement sensor.

12. The protective device of claim 1, further comprising a proximity sensor configured to cause the airbag assembly to be disabled when the proximity sensor does not detect a body or clothing of the individual.

13. The protective device of claim 12, wherein the proximity sensor is located at an inside surface of the first buckle half, the second buckle half comprises an extended back wall that extends behind the first buckle half when the first and second buckle halves are attached to one another, and the back wall of the second buckle half includes a cutout configured to allow the proximity sensor to detect the body or clothing of the individual through the cutout.

* * * * *